(No Model.)

W. T. S. MORRISON.
BICYCLE ICE CREEPER.

No. 560,859. Patented May 26, 1896.

Witnesses.
A. C. Perry.
W. W. Thomas 2d

Inventor
William T. S. Morrison
by George E. Bird.
Attorney.

ANDREW B.GRAHAM. PHOTO-LITHO. WASHINGTON. D.C.

United States Patent Office.

WILLIAM T. S. MORRISON, OF CORNISH, MAINE.

BICYCLE ICE-CREEPER.

SPECIFICATION forming part of Letters Patent No. 560,859, dated May 26, 1896.

Application filed August 16, 1895. Serial No. 559,461. (No model.)

*To all whom it may concern:*

Be it known that I, WILLIAM T. S. MORRISON, a citizen of the United States, residing at Cornish, in the county of York and State of Maine, have invented certain new and useful Improvements in Bicycle Ice-Creepers; and I do hereby declare that the following is a full, clear, and exact description of the invention, which will enable others skilled in the art to which it appertains to make and use the same.

My invention relates to bicycles, and its purpose is to provide a safe and convenient device to be attached to the tires of the wheels to enable the bicycle to be safely and conveniently used upon ice or hard snow.

It consists of a spur-piece bearing the points which come into contact with the ice and a strap carrying the same, together with suitable means for securing the strap around the tire and rim. By reason of the adhesive character of the inner side of the strap the device is adjustable and capable of attachment to a tire of any size.

Figure 1:
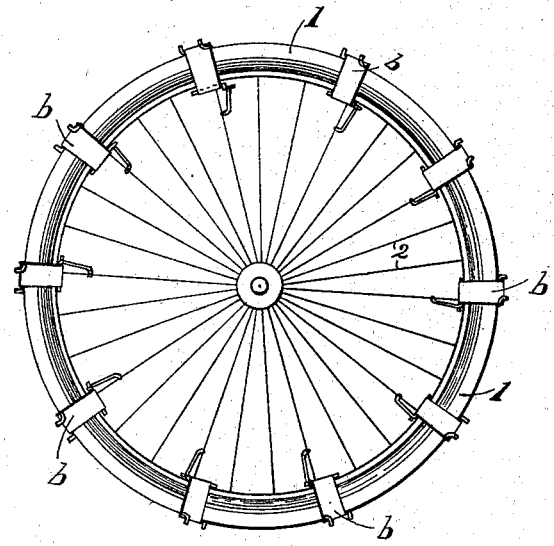
Figure 2:
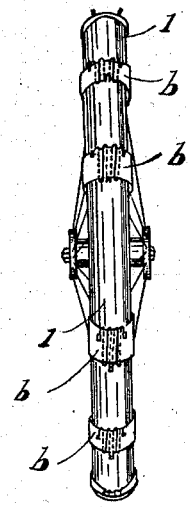
Figure 3:
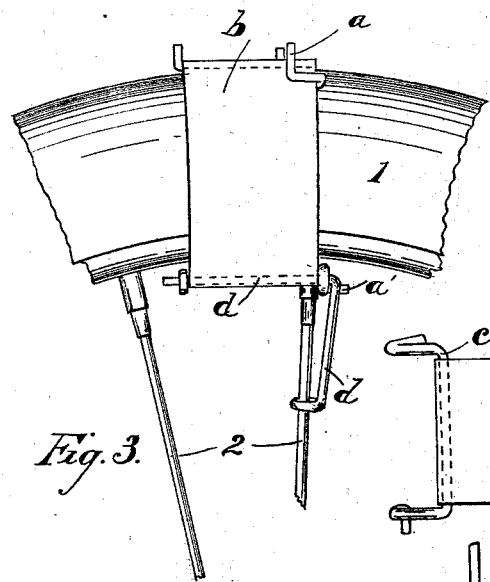
Figure 4:
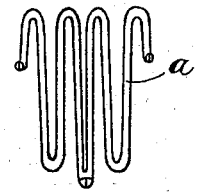
Figure 7:
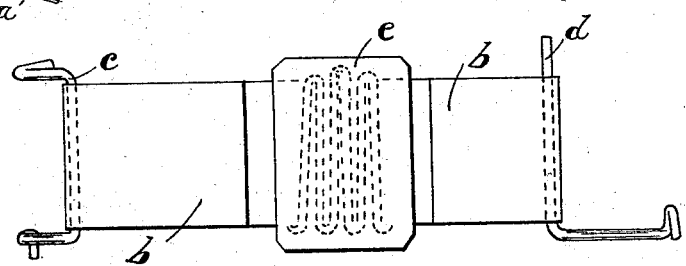
Figures 5, 6:
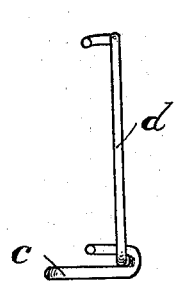

In the drawings, Figure 1 is a side elevation of a bicycle-wheel with my device attached. Fig. 2 is a rear end view of the same. Fig. 3 is a detail of a portion of the tire with my device attached. Fig. 4 is a top plan of the spur-piece. Fig. 5 is a top plan of the parts of the fastening device. Fig. 6 is a side elevation of the same as in use, and Fig. 7 is a top plan of the creeper.

The device which comes in contact with the ice and prevents the tire 1 from slipping, or spur-piece $a$, is shown in Fig. 4. It consists of wire of Bessemer steel, looped, as shown in the drawings, the ends of the wire and the middle loop being turned down and sharpened, as shown. To connect this with the tire, I make use of a strap $b$, of non-elastic material, adhesive or frictioned on the inner side. I prefer to coat the outer side of the strap with rubber, as it tends to increase its durability and forms a surface of practically the same character as the tire. The middle portion of the strap is interwoven with the loops of the spur-piece $a$, the points already described being upon the outer side of the strap.

The device by means of which the strap is secured around the tire and rim of the wheel consists of two pieces $c$ and $d$, which are shown in Figs. 5 and 6. One of these pieces $c$ is bent at right angles at either end, forming elbows or arms of equal length, the ends of the arms being turned inward, (forming open loops,) as shown in the drawings, while one of these ends is also turned outward at right angles, as shown at $a'$ in Fig. 5. The space between the arms should be slightly greater than the width of the strap $b$. The other part $d$ consists of a right-angled piece, the upper end of which terminates in an open loop, as shown in Figs. 5 and 6, the loop being of such size as to enable it to receive within it the spoke of the wheel. A rectangular piece $e$ of the same material as the strap may also be provided of sufficient size to cover the spur-piece $a$ and project somewhat beyond the edges of the strap $b$, as seen in Fig. 7.

The operation of the device is as follows: The middle of the strap is first interwoven with the loop of the spur-piece $a$, as already described and as shown in Fig. 7. In fitting the creepers the greater part of the air should be allowed to escape from the tire. The requisite length of the strap having been ascertained by measuring around the tire and rim, the fastening-pieces $c$ and $d$, respectively, are laid upon the upper or adhesive surface of the strap at the proper points and the ends of the strap carried over them and pressed down until their adhesive surfaces unite to some degree. The piece $e$, if used, (with adhesive surface downward,) is then laid over the spur-piece $a$, as shown in Fig. 7, in order to prevent injury from the loops to the tire of the wheel. The creeper thus prepared is then placed around the tire and rim of the wheel just in front of the spoke (the spur-piece being at the center of the tire) when the loops of the piece $c$ are placed around the right-angled piece $d$, which is then carried upward against the projecting end $a$ (which rests against and in front of one side of the spoke) and its loop passed around the other side of the spoke, as shown in Fig. 3. Thus placed and secured, the creeper is maintained in a secure position, the connection with the spoke preventing its sliding upon the tire.

The creepers are placed upon the tire in like manner at equal distances. I prefer to place eight upon the front wheel and twelve upon the rear wheel of the ordinary safety-bicycle; but the number may of course be increased and perhaps diminished at the option of the user. The tire is now inflated.

The advantages of the device are apparent. It is adjustable to all tires, whether pneumatic or not; is held firmly by the fastenings and compression; causes no injury to the tire nor affects its resilience, and can easily be adjusted by any one and without tools. Its weight is inconsiderable.

With this device the bicycle can be used upon the ice in practically the same manner as upon the road.

What I claim is—

1. In combination with a pneumatic tire a flexible strap bearing two or more points, said strap having an adhesive inner surface and holding within its folded ends a fastening device whereby said strap is secured around the rim and tire, substantially as described.

2. In an ice-creeper for bicycles, the combination of a spur-piece having two or more downwardly-depending points, a flexible strap holding the same, said strap having an adhesive inner surface and a fastening device the parts of which are held within the folded ends of said strap, substantially as described.

3. In an ice-creeper for bicycles, the combination of a spur-piece of multiple-looped wire bearing two or more downwardly-depending points, a strap interwoven with the loops of said wire, said strap having an adhesive inner surface and a fastening device, the parts of which are held within folds of the ends of said strap respectively, substantially as described.

4. The combination in an ice-creeper for bicycles of the spur-piece $a$, the adhesive-surfaced strap $b$ and the fastening-pieces $c$ and $d$, substantially as described.

5. In an ice-creeper for bicycles, the combination of a spur-piece of multiple-looped wire with two or more depending points, a strap interwoven with the loops of said wire, said strap having an adhesive inner surface, a fastening device, the parts of which are connected with the ends of said strap and a piece of flexible material placed over the upper surface of said wire, substantially as described.

6. The combination of the spoke and rim of a bicycle, with a fastening consisting of the double-angled wire having open loops at the ends, one of which ends is also turned outward at right angles with the plane of the loop, and a right-angled piece having at its upper end an open loop and a strap, the ends of which are connected with the parts of said fastening-pieces, substantially as described.

7. In combination with a pneumatic tire a flexible strap bearing two or more points, said strap having an adhesive inner surface and holding, within its folded ends by means of its adhesiveness and compression on said folded ends, a fastening device whereby said strap is secured around the rim and tire, substantially as described.

In testimony that I claim the foregoing as my invention I have hereunto set my hand this 13th day of August, A. D. 1895.

WILLIAM T. S. MORRISON.

In presence of—
GEO. H. PARKER,
E. M. HUBBARD.